H. T. CRAPO.
MOTION PICTURE AND VOICE REPRODUCING MACHINE.
APPLICATION FILED JAN. 10, 1912.
1,062,324.
Patented May 20, 1913.
3 SHEETS—SHEET 3.
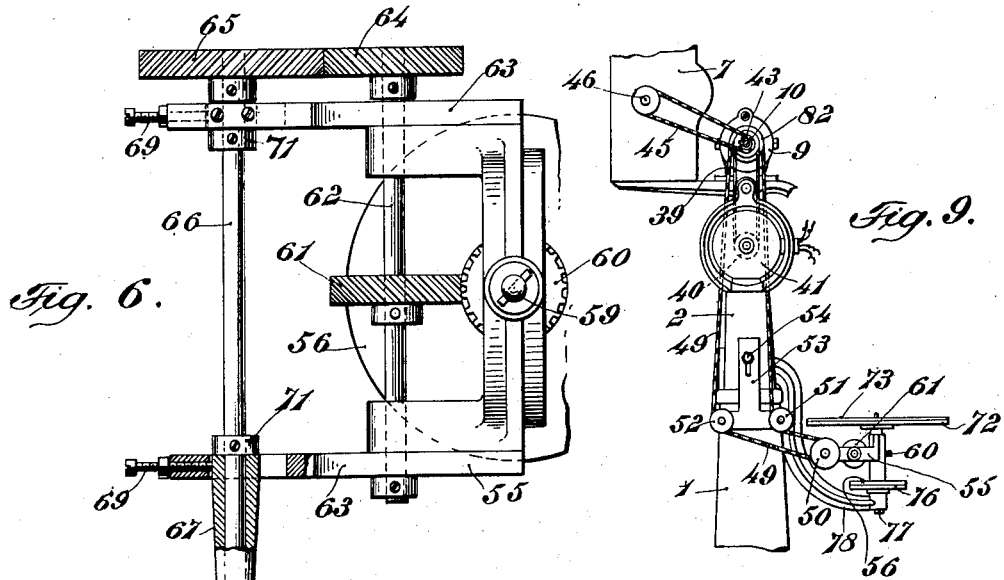
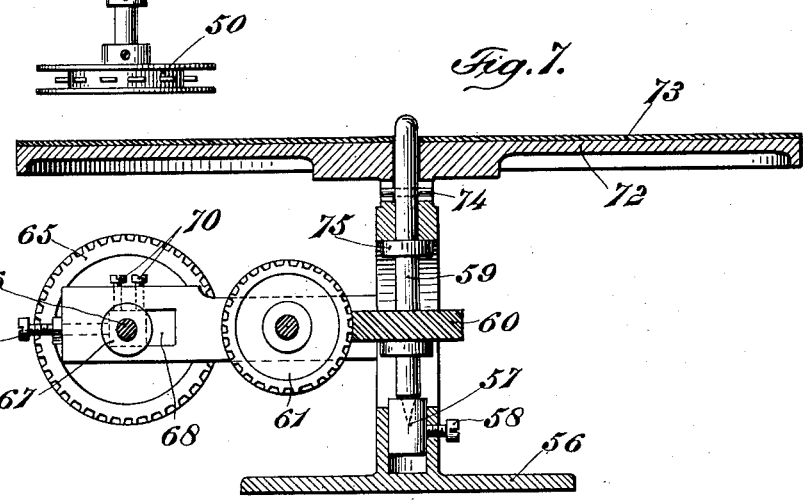
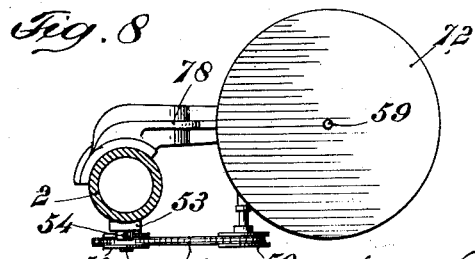

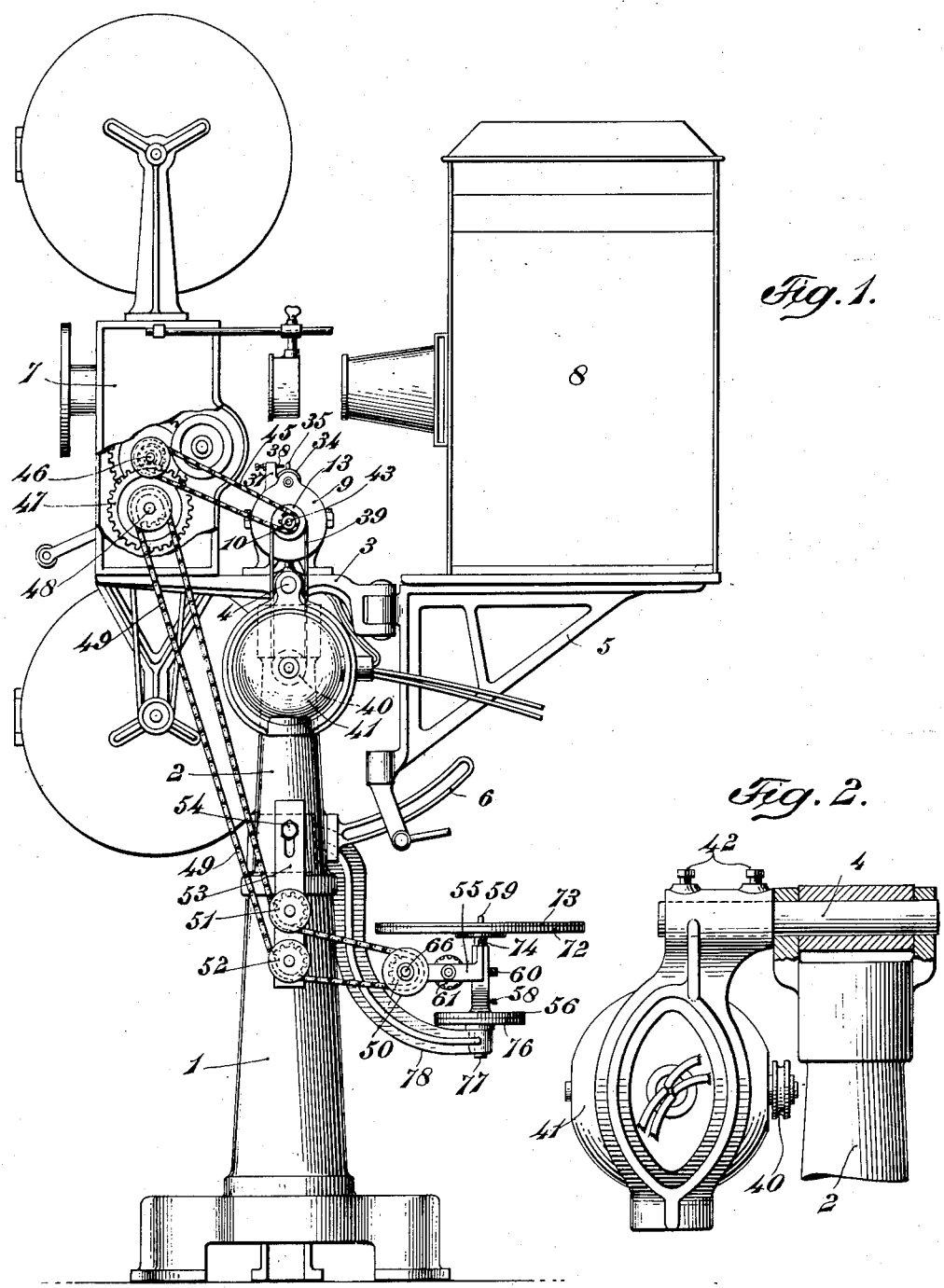

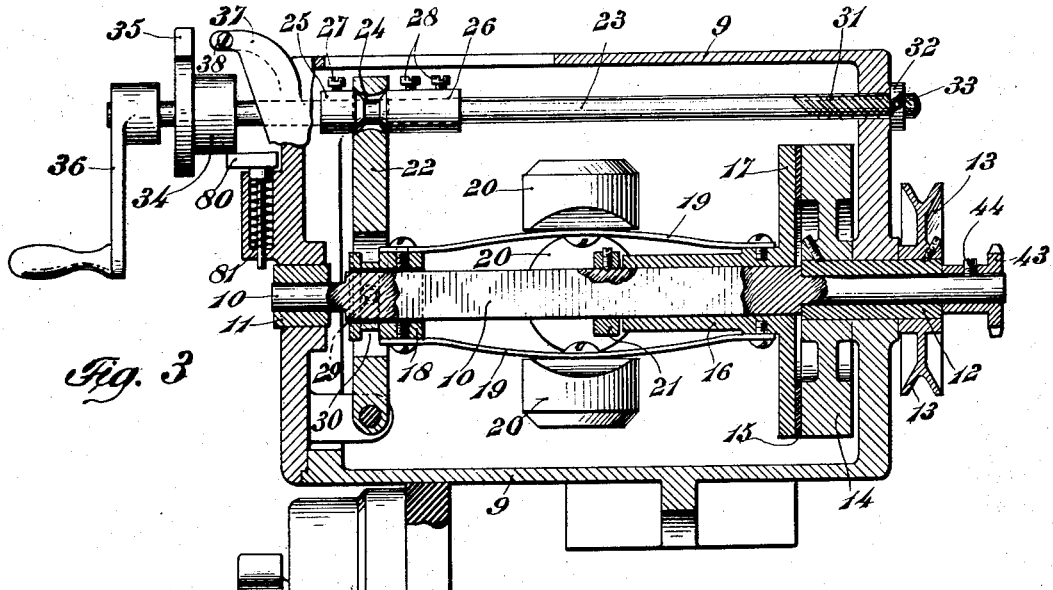
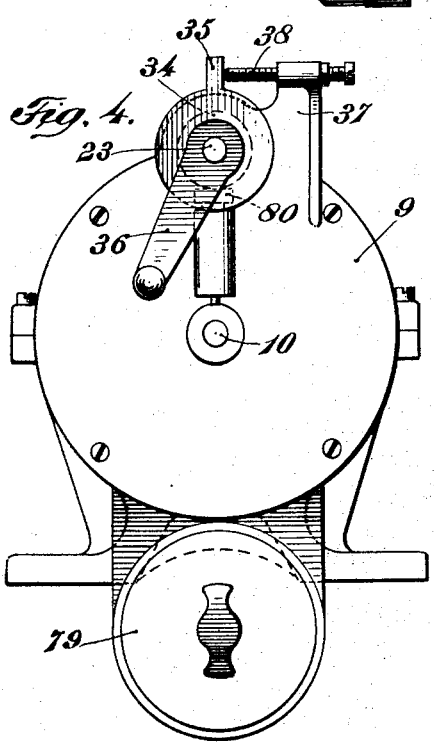
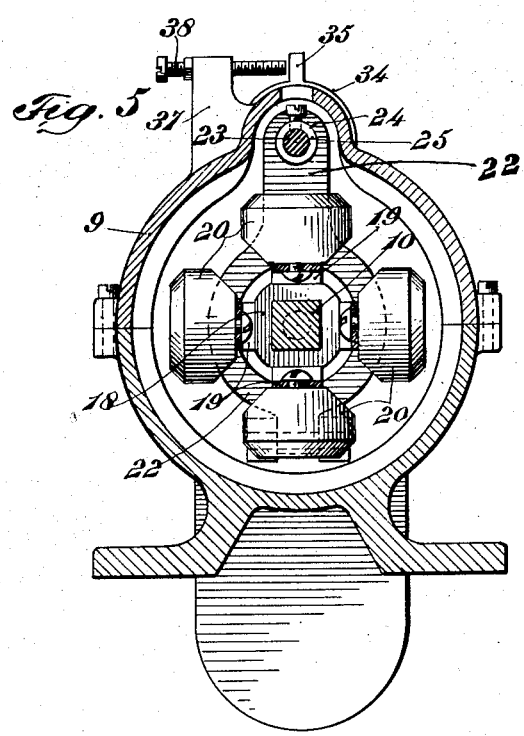

UNITED STATES PATENT OFFICE.

HENRY THEODORE CRAPO, OF NEW YORK, N. Y., ASSIGNOR TO GEORGE REGESTER WEBB, OF BALTIMORE, MARYLAND.

MOTION-PICTURE AND VOICE-REPRODUCING MACHINE.

1,062,324. Specification of Letters Patent. Patented May 20, 1913.

Application filed January 10, 1912. Serial No. 670,496.

*To all whom it may concern:*

Be it known that I, HENRY THEODORE CRAPO, a citizen of the United States, residing at New York city, in the county of New York and State of New York, have invented certain new and useful Improvements in Motion-Picture and Voice-Reproducing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to motion-picture and voice machines in which the motion picture machine and the voice reproducing machine or device are caused to co-act in unison so that as the picture in motion is projected on to the screen there will be simultaneously given forth a reproduction of the voice of the motion figures displayed upon the screen, the voice reproduction being in synchronism with the action or movement of the figure or figures, human or animal, projected upon the screen, so as to give to the projected picture-figures a realistic effect, the vocal reproduction being either of a musical or a talking, or other vocal reproduction of whatever character it may be in correspondence with the nature of the motion pictures projected upon the screen.

The invention has for its object to insure so far as possible a perfect synchronism between the motion picture figures or representations and the vocal reproduction by means best calculated to insure such synchronism during the whole period of the simultaneous motion-pictures and vocal reproduction.

It has also for its object to provide a single motor for driving the motion picture machine and actuating the voice reproducing device, the one in synchronism with the other; also to provide means under which the operation of the motion picture machine and the voice reproducer may be at rest while the motor continues active or in operation; also to provide means whereby motion may be transmitted from the motor to the motion picture machine and to the voice reproducer first at a relatively low rate of speed, but in synchronism, and then by a relatively higher speed meeting the requirements to effect the reproduction of both corresponding to the original subject-matter reproduced.

To the accomplishment of the foregoing and such other objects as may hereinafter appear the invention consists in the features hereinafter particularly described and then sought to be clearly pointed out, reference being had to the accompanying drawings illustrating one form of mechanism suitable for carrying out the objects of the invention, and in which:

Figure 1 is a side elevation, partly in section of a motion picture machine and voice reproducing device combined with the features constituting the invention; Fig. 2 is a detailed view, partly in section, showing the manner of supporting the motor; Fig. 3 a vertical longitudinal section through the governor mechanism; Fig. 4 an end view of the governor mechanism; Fig. 5 a vertical section through the governor mechanism looking from the right of Fig. 1; Fig. 6 a detailed plan view of some parts of the voice reproducer device; Fig. 7 a side elevation, with parts in section, of the voice reproducer device; Fig. 8 a detailed view showing in plan parts of the voice reproducer device, including its supporting arm, and showing the central pillar in section; and Fig. 9 a side view showing a modified form of the invention, with parts omitted.

In the drawings the numeral 1 designates a supporting pillar; the upper portion 2 of which is revoluble upon the lower portion and carries a bed-plate mounted upon a shaft 4 upon which it may be rotatably adjusted, and 5 designates a bracket pivotally connected with the bed-plate 3 so as to swing horizontally, and provided with suitable means by which it may be locked to an arm 6 extending from the portion 2 of the pillar, and upon the bed-plate 3 and the bracket 5 are mounted the members 7 and 8 of a motion picture machine, said parts so far described, with the exception of mounting the motor, being of a well-known type of motion picture machine and selected merely for the purposes of illustration, with the present invention applied thereto, although the invention is applicable to any approved type of motion picture machine.

Upon the bed plate 3 is mounted a casing 9, which may be bolted or otherwise secured thereto, and which contains governor mechanism as follows: It consists of a shaft 10 which is angular in cross-section and whose opposite ends are reduced in diameter and mounted respectively in opposite ends of the casing 9 so as to be rotatable, one end of the shaft having a bearing in a block 11 and the other end in a sleeve 12 which is journaled in that end of the casing. The sleeve 12 has secured to it, outside of the casing, a pulley 13, and inside of the casing the sleeve has secured to it a disk 14 having a frictional face formed of any suitable material 15. Upon the angular portion of the shaft 10 is mounted a sleeve 16 which has a disk 17 next to the disk 14, said sleeve 16 being slidable upon the shaft 10 and rotatable therewith. At the opposite end of the shaft 10 is mounted a block or hub 18 which is slidable upon and rotatable with the shaft 10, and this block or hub 18 is connected with the sleeve 16 by spring plates 19 upon each of which is secured a weight 20, approximately midway between the ends of the plates, which serve as centrifugal governor weights, and near the inner end of the sleeve 16 a collar 21 is adjustably secured so as to limit the sliding movement of the sleeve and the disk which it carries. Within the casing at one end thereof, there is pivoted or hinged an arm or yoke 22 which at its upper end has a free connection with the shaft 23, the connection being effected preferably by the shaft passing through an opening 24 in the yoke, and adjustable collars 25 and 26 held by screws 27 and 28, or otherwise, one at each side of the yoke; and this yoke is connected with the slidable hub 18 by means of a pin 29 fitting in a groove 30 formed in the hub, or otherwise, so as to permit the hub to slide upon the shaft and rotate therewith, said connection serving to permit the adjustment of the hub 18 longitudinally of the shaft 10 through the instrumentality of the arm or yoke 22. The shaft 23 is formed with a thread 31 at one end and has a bearing in a corresponding threaded opening formed in that end of the governor casing, and at the same end is provided with a washer or collar 32, the collar adapted to be secured at any desired point thereon by means of a set screw 33. The opposite end of this shaft is journaled in the other end of the governor casing and carries a sleeve or collar 34 held securely thereto so as to turn therewith by any suitable means and is provided with what for convenience will be designated as a finger or stop 35, and the extreme end of the shaft may be provided with a crank handle 36 or other means for turning the shaft. From the end of the casing adjacent to the stop 35 there projects an arm or bracket 37 provided with an adjustable screw 38. The parts described constitute the governor mechanism. The pulley or wheel 13 is connected by a band or belt 39, or other suitable means, with a drive pulley or wheel 40 on the shaft of the motor 41, which may be and as illustrated is an electric motor of any approved type and which is hung from the shaft 4 and may be attached thereto by set screws 42. By thus connecting the disk 14 of the governor with the motor, said friction disk may be rotated without transmitting motion to other parts of the governor, the companion friction disk 17 of the governor in such case being moved out of contact with the face of the disk 14, but when said disks 14 and 15 are in frictional contact motion will be transmitted to the governor or shaft 10 and the parts operated therefrom. The outer reduced end of the shaft 10 next to the wheel 13 is provided with a sprocket wheel 43 secured thereto by a screw 44 or otherwise and from the sprocket wheel a belt or drive chain 45 extends to a sprocket wheel 46 on a shaft of the operating drive mechanism contained within the member 7 of the motion picture machine, and said sprocket wheel 46 meshes with a toothed wheel 47 of the motion picture mechanism, the shaft of which toothed wheel carries a sprocket wheel 48 from which a drive chain 49 extends to a sprocket wheel 50 of the voice reproducing device, said drive chain 49 passing around toothed wheels 51 and 52 which serve as belt tighteners and are carried by an arm 53 which is vertically adjustable by a holding screw 54 on the upper rotatable portion of the pillar 1.

The voice reproducer device in the particular form illustrated comprises a stand or frame 55 having a base plate 56 in which is held a step 57 by a screw 58, said step supporting a rotatable shaft 59 provided with a gear 60 which meshes with a gear 61 mounted on a shaft 62 journaled in arms 63 of the frame and carrying a gear 64 which meshes with a gear 65 secured to a shaft 66 journaled in boxes 67 fitting in slots 68 formed in the rear of the arms 63, said boxes being capable of adjustment by screws 69 and held to their adjustments by screws 70 passing through the arms and engaging the boxes, the shaft 66 at each end of the boxes 67 being provided with adjustable collars 71 which hold the shaft 66 against longitudinal movement. The shaft 66 carries the sprocket wheel 50 before mentioned as receiving the drive chain 49. The shaft 59 carries at its upper portion a detachable disk or plate 72 upon which will rest the record containing disk 73 so that said record disk and supporting plate will rotate with the shaft 59. The shaft 59 is shown as provided with a laterally extending pin 74 which fits in a slot formed in the hub portion of the plate 72 so as to cause said plate to rotate with the shaft, and a collar 75 may be secured to the shaft 59 so as to control said shaft in its vertical adjustment. The base plate 56 of the frame 55 rests upon a disk 76 which has a stud or shaft 77 fitting in the lower end of an arm 78 which is secured to the upper rotatable portion 2 of the pillar 1.

By connecting the motion picture machine and also the record producing device in the manner described with the motor it will be seen that both of said devices are driven from the same motor; and that when it is desired to throw the motion picture machine and the voice reproducing device out of operation it is only necessary to break contact between the friction disks 14 and 17 of the governor whereupon the motor may continue in operation without motion being transmitted to either of the devices mentioned.

By placing both the moving picture device and the sound reproducer device under control of the same governor-coupling which connects both devices to the same drive member, precisely the same power transmission conditions are afforded for both of the devices and each is under the influence of the same speed control derived from the governor-coupling and thus uniformity of motion is maintained between the two devices. This is important in machines of this type because if either the motion picture device or the sound reproducing device is under a different drive from the other there is apt to be set up or arise a different state of conditions in one from the other and such difference if not corrected would impair the coöperative efficiency of the moving picture machine and the sound reproducer. But by constructing the parts so that the motion picture device and the sound reproducer are both connected to the drive member by the same coupling in the form of a governor driven from the drive member an even and regular transmission of power to both devices, the same in all particulars for each, is obtained, and thus the governor is caused to discharge the function of compensating for irregularities in the motor or drive and also for variations occurring in either of the driven parts of the apparatus arising from causes outside of the motor or drive so that the efficiency of either driven part will not be impaired. Otherwise stated, when the governor is coupled to the sound reproducer as well as to the picture machine and to the drive so that the power is transmitted through the governor to both the sound reproducer and to the picture machine, and all three devices, each performing a separate function, thus coupled up with one another, the governor is caused to compensate or correct variations in either of the two driven devices as well as in the drive, and this results in obtaining a more uniform co-action between the devices and a clearer reproduction of sound vibrations from the record while at the same time maintaining synchronism between the picture machine and the sound reproducing device or record.

Another advantage of the construction illustrated is that the connection of the drive-member to the governor-coupling and the connection of the power transmission element from the coupling to the motion picture device and the sound reproducer are at the same end of the governor-shaft, as illustrated. This further tends to afford a more uniform transmission of power from the drive to the driven parts because the irregularity of motion arising from possible flexure in a governor-shaft where the drive is connected to one end and the power transmission member to the other end of the shaft is guarded against. These various items are of importance where synchronism is to be maintained between two devices such as a motion picture device and a sound reproducer device.

The motor illustrated is under the control of a switch device 79 of any approved type so that when it is desired to stop the motor said switch is turned off, and by this switch the motor can be started up at any time desired.

Under the illustration given the gears are so proportioned that the governor shaft is connected to the sprocket of the motion picture machine at a speed of two hundred and forty revolutions per minute, and compounded gears from its shaft operate the film mechanism, projecting sixteen pictures per second or nine hundred and sixty per minute. Said sprocket shaft is also compounded so as to cause the lower sprocket shaft 48 to run one revolution per second or sixty per minute, and this lower sprocket is chained to the sprocket 50 of the voice reproducer device with the gears of that device properly proportioned as to rotate the record disk at a speed of one and one-quarter revolutions per second or eighty per minute. The foregoing is given merely in an illustrative way as it is to be understood that if conditions require different relative speeds of the parts the gears necessary for the purpose can be changed to suit the conditions with the exercise of ordinary mechanical skill.

In adjusting the governor mechanism consideration has to be had with respect to the speed at which the motion picture machine and the voice reproducer device are to be actuated, and this is effected by adjustment of the sleeve 16 and hub 18 toward or from each other by means of the yoke 22 and the shaft 23 so that the governor weights 20 through their spring plates 19 will cause the necessary friction between the disks 14 and 17 so as to give the requisite speed for the proper speeding of the motion picture machine and voice reproducer device. When the shaft 23 has been adjusted to the proper position for that purpose the collar 32 is adjusted so as to prevent the screw shaft 23 from changing from its adjusted position except when manually manipulated to change its adjustment. When the parts are adjusted as stated and the switch is turned so as to set into action the motor, the friction disks 14 and 17 will start together at a slow speed and the motion picture machine and the voice reproducer device will be started together at a slow speed. By then turning the screw shaft 23 the friction disks 17 and 14 will be brought into closer frictional contact so that the speed is gradually raised until in the rotation of the shaft 23 the stop 35 on that shaft is brought against the end of the screw 38 at which period the parts are operated at the maximum speed and complete synchronism prevails between the motion picture machine and the voice reproducer device. At this speed the governor weights will be thrown out under excess of speed so as to lessen contact between the frictional faces of the disks 14 and 17 and lowering the excess of speed occurring the collar 21 on the shaft 10 limiting the inward movement of the sleeve 16, and the governor weights through their spring plates tending to promptly restore the normal frictional contact between the disks 14 and 17. During the operation of the machine if for any cause it should be found desirable or necessary to vary the speed, this can be effected by turning the screw shaft 23 in one direction to change the speed and by adjusting the screw 38 so that the stop 35 will contact with its end in such adjustment. In order to prevent the screw shaft 23 from accidentally turning from its adjustment a brake shoe 80 is caused to bear against the collar 34 under the pressure of a spring 81 as illustrated in Fig. 3 of the drawing.

In Fig. 9 of the drawing I have illustrated a modification in which the voice reproducer device is actuated from the governor shaft by passing the chain 49 around a sprocket wheel 82 fastened to the reduced portion of the governor drive shaft 10 as illustrated in Fig. 9. The operation however under this modification is the same as that already described.

A transmitter of any approved type will be used in connection with the record for giving forth or transmitting the voice or wave vibrations reproduced from the record, and a receiver or receivers located at appropriate places in the auditorium may be connected in circuit with the electrical transmitter if such type of transmitter be employed.

Having described my invention and set forth its merits what I claim is:—

1. A motion-picture and sound reproducer machine comprising a motion-picture device, a sound reproducer device, said devices being geared to run at relatively different speeds, a drive member, and a governor-coupling controlled by the drive member and connecting both of said devices and said drive member so as to produce unison of action between the picture device and the sound reproducer without change in the relative speeds under fluctuations of speed derived from the drive member, substantially as described.

2. A motion picture and sound reproducer machine comprising a motion-picture device, a sound reproducer device, said devices being geared to run at relatively different speeds, a drive member, a governor-coupling controlled by the drive member and connecting both of said devices and the drive member to produce unison of action between the picture device and sound reproducer without change in their relative speeds under fluctuations of speed derived from the drive member, and means for positively moving one of the elements of the governor-coupling to and fro, with relation to the other, to fix the normal running speed of the picture and sound reproducer devices in unison with each other, substantially as described.

3. A motion picture and sound reproducer machine comprising a motion-picture device, a sound reproducer device, said devices being geared to run at relatively different speeds, a drive member, a governor-coupling controlled by the drive member and connecting both of said devices and the drive to produce unison of action between the picture device and sound reproducer without change in their relative speeds under fluctuations of speed derived from the drive member, and means for positively limiting to and fro movement of elements of the governor-coupling in adjustment of the governor-coupling to and from position for the normal running speed of the picture and sound reproducer devices, substantially as described.

4. A motion-picture and sound reproducer machine, comprising a motion-picture device, a sound reproducer device, said devices being geared to run at relatively different speeds, a drive member, a governor-coupling controlled by the drive member and connecting both of said devices and the drive member to produce unison of action between the picture device and sound reproducer, and means for actuating the governor-coupling to start the picture device and the sound reproducer in unison at a low speed and raise the speed of both devices to the requisite normal running speed in unison with each other, substantially as described.

5. A motion picture and sound reproducer machine, comprising a motion picture device, and sound reproducer device, a drive member, and a coupling connecting the motion picture device, sound reproducer device, and drive member, said motion picture device and coupling being tiltable independent of the sound reproducer device, and the sound reproducer device having a yielding connection with said tiltable members, substantially as described.

6. A motion picture and sound reproducer machine, comprising a motion picture device, and a sound reproducer device, said devices being geared to run at relatively different speeds, a drive member, and a governor-coupling controlled by the drive member and connecting the drive member through power transmission elements with both the motion picture device and the sound reproducer device, the connection of the drive member to the coupling and the connection of the power transmission element from the coupling to the motion picture device and the sound reproducer device being at the same end of the governor-coupling, substantially as described.

7. A motion picture and sound reproducer machine, comprising a motion picture device, a sound reproducer device, a drive member, and a governor coupling connecting the drive member with driven parts of the picture machine and the sound reproducer and co-acting with the drive and the two driven devices to derive motion from the drive and transmit it to both of the driven devices and to bring variations occurring in either the picture machine, the sound reproducer, or the drive under the control of the governor coupling the three together, substantially as described.

In testimony whereof I affix my signature in presence of two witnesses.

HENRY THEODORE CRAPO.

Witnesses:
WILLIAM PRESTON STUNZ,
CHARLES ABNER BENTON.